United States Patent
Lecocq et al.

(10) Patent No.: US 6,524,017 B2
(45) Date of Patent: Feb. 25, 2003

(54) ARRANGEMENT CONSISTING OF A PHOTODIODE AND AN OPTICAL FIBER

(75) Inventors: Vincent Lecocq, Asnières (FR); Alain Tournereau, Chalette sur Loing (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/840,051

(22) Filed: Apr. 24, 2001

(65) Prior Publication Data
US 2001/0041033 A1 Nov. 15, 2001

(30) Foreign Application Priority Data
May 9, 2000 (EP) .............................. 00440129

(51) Int. Cl.[7] ................................. G02B 6/36
(52) U.S. Cl. ..................... 385/88; 385/49; 257/431; 257/432
(58) Field of Search ............... 385/88–94, 49; 359/152; 257/431, 432, 433, 434

(56) References Cited

U.S. PATENT DOCUMENTS

| | | | | |
|---|---|---|---|---|
| 4,170,399 A | | 10/1979 | Hansen et al. | |
| 4,186,996 A | * | 2/1980 | Bowen et al. | 257/98 |
| 4,192,574 A | * | 3/1980 | Henry et al. | 250/227.24 |
| 4,241,978 A | * | 12/1980 | Dubois et al. | 385/31 |
| 4,268,114 A | * | 5/1981 | d'Auria et al. | 385/88 |
| 4,329,190 A | * | 5/1982 | Berg et al. | 156/293 |
| 4,647,331 A | * | 3/1987 | Koury et al. | 156/273.9 |
| 5,032,898 A | * | 7/1991 | Bowen et al. | 257/433 |
| 5,065,011 A | * | 11/1991 | Fujihara et al. | 250/227.24 |
| 5,361,317 A | * | 11/1994 | Hartman et al. | 385/43 |
| 5,392,372 A | * | 2/1995 | Kurata et al. | 250/227.11 |
| 6,017,681 A | | 1/2000 | Tsukamoto et al. | |

FOREIGN PATENT DOCUMENTS

| | | |
|---|---|---|
| EP | 0 563 725 A1 | 10/1993 |
| JP | 57 058 369 A | 4/1982 |
| JP | 04 159 504 A | 6/1992 |

OTHER PUBLICATIONS

"Adhesives for Optical Devices", Proceedings of the Electronic Components and Technology Conference, US, New York, NY: IEEE May 25, 1998, pp. 1178–1185, XP000803697 ISBN: 0–7803–4527–4.

* cited by examiner

Primary Examiner—Hemang Sanghavi
Assistant Examiner—Scott A Knauss
(74) Attorney, Agent, or Firm—Sughrue Mion, PLLC

(57) ABSTRACT

In the arrangement according to the invention, a photodiode (PD) mounted on a submount (SM) and contacted by contact wires (GW) has its photosensitive surface (PS) attached directly to one fiber end by means of an optically transparent adhesive (CG). The fiber (OF) is fastened on a circuit board (BD) to which the contact wires (GW) of the photodiode (PD) are connected. The adhesive joint (CG) between photodiode (PD) and fiber (OF) represents the only mechanical attachment of the photodiode (PD).

7 Claims, 2 Drawing Sheets

ARRANGEMENT CONSISTING OF A PHOTODIODE AND AN OPTICAL FIBER

FIELD OF THE INVENTION

This invention relates to an arrangement consisting of a photodiode and an optical fiber, to a circuit board on which a fiber with a photodiode is fastened and which contains a control circuit for the photodiode, and to a method of coupling an optical fiber to a photodiode.

BACKGROUND OF THE INVENTION

In optical data communications, optical fibers are used as light guides. Receivers are photodiodes to which one end of the light-guiding fibers is coupled. The coupling between fiber and photodiode is of great importance. Conventionally, mechanical parts are used to hold the fiber and the photodiode in an optimum position relative to each other.

U.S. Pat. No. 6,017,681 discloses an arrangement in which the photodiode and the fiber are fixed to a substrate. A photosensitive material is then deposited between the fiber and the photodiode, and during the setting of the material, light is applied from the fiber to the material. This changes the optical properties of the photosensitive material in such a way that it forms a coupler between fiber and photodiode.

The mechanical parts that hold the photodiode and the fiber in position relative to each other must be formed with high precision because the permissible alignment tolerances are in the range of a few micrometers. This makes the mass production of the mechanical parts complex and expensive.

SUMMARY OF THE INVENTION

It is therefore an object of the present invention to provide an arrangement consisting of a photodiode and an optical fiber wherein good coupling is achieved in a simple manner. Another object of the invention is to provide a circuit board equipped with a photodiode and a control circuit for the photodiode on which an optical fiber is fastened which is coupled to the photodiode in a simpler manner. A further object of the invention is to provide a less complex method of coupling a fiber to a photodiode.

The object is attained by an arrangement of a photodiode and an optical fiber. The photodiode is mounted on a submount and contacted by at least one contact wire. The photosensitive surface of the photodiode is attached directly to one end of the optical fiber by an optically transparent adhesive.

In another aspect of the present invention, the object is attained by a circuit board having an optical fiber fastened thereon. The photosensitive surface of a photodiode is directly attached by an optically transparent adhesive to the end of the fiber. The photodiode is contacted by at least one contact wire which is connected to the circuit board. The circuit board is fitted with semiconductor components which form a control circuit for the photodiode. The adhesive joint between fiber and photodiode represents the only mechanical attachment of the photodiode. Preferably, a silicone pad is arranged between the submount and the circuit board.

According to the invention, the method of coupling an optical fiber to a photodiode comprises the steps of mounting the photodiode on a submount, contacting the photodiode by means of at least one contact wire, and attaching the photosensitive surface of the photodiode (PD) to one end of the optical fiber using an optically transparent adhesive.

Further developments of the invention are apparent from the dependent claims.

Particular advantages of the invention are that the dependence on temperature variations is reduced, that the arrangement is free of mechanical stress, that compared with conventional arrangements, photosensitivity is increased by about 10%, that very short leads can be used, which is important for applications at high bit rates (gigahertz range), and that the arrangement can be made very compact. The invention is also ideally suited for circuits with two or more photodiodes and fibers.

BRIEF DESCRIPTION OF THE FIGURES

Two embodiments of the invention will now be explained with reference to the accompanying drawing, in which.

DETAILED DESCRIPTION OF THE INVENTION

Figure 1:
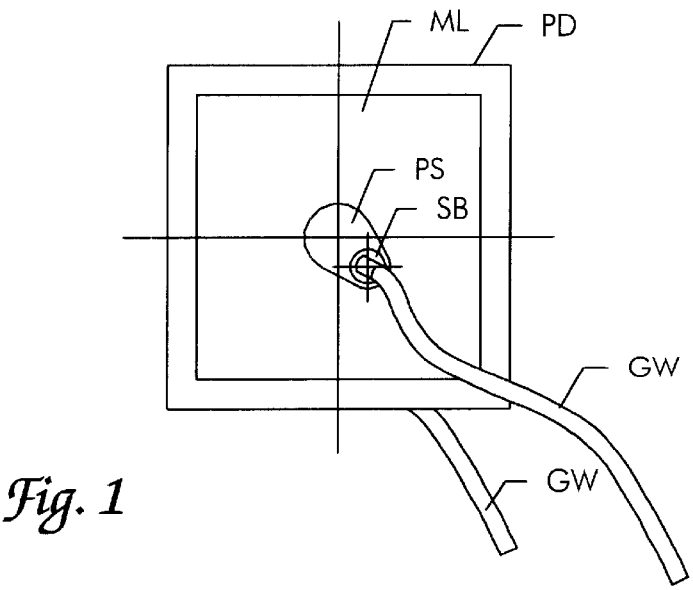
FIG. 1 shows a photodiode with leads.

The photodiode PD shown in FIG. 1 is a semiconductor chip that is contacted on both sides by gold wires GW. On one side, photodiode PD has a photosensitive surface PS with a diameter of the order of 30 to 80 $\mu$m. The remaining surface of the chip has a metal layer ML deposited thereon which acts as a contact area. On the other side of the chip, a metal layer is deposited over the entire surface. Gold wires GW are 18 $\mu$m in diameter and are connected to a solder pad SB on metal layer ML.

To fabricate the arrangement, in a first step, the gold wires are soldered to the metal layer of the semiconductor chip. Next, the photodiode is aligned to the fiber end, e.g., on a three-axis micrometric translation stage, and its photosensitive surface is attached to the fiber end using an optically transparent adhesive. The photodiode and the fiber are held in place until the adhesive has set. To set the adhesive, in the embodiment, it is irradiated with ultraviolet light. Finally, the fiber is fastened on a circuit board, and the gold wires of the photodiode are connected to the circuit board.

Figure 2:
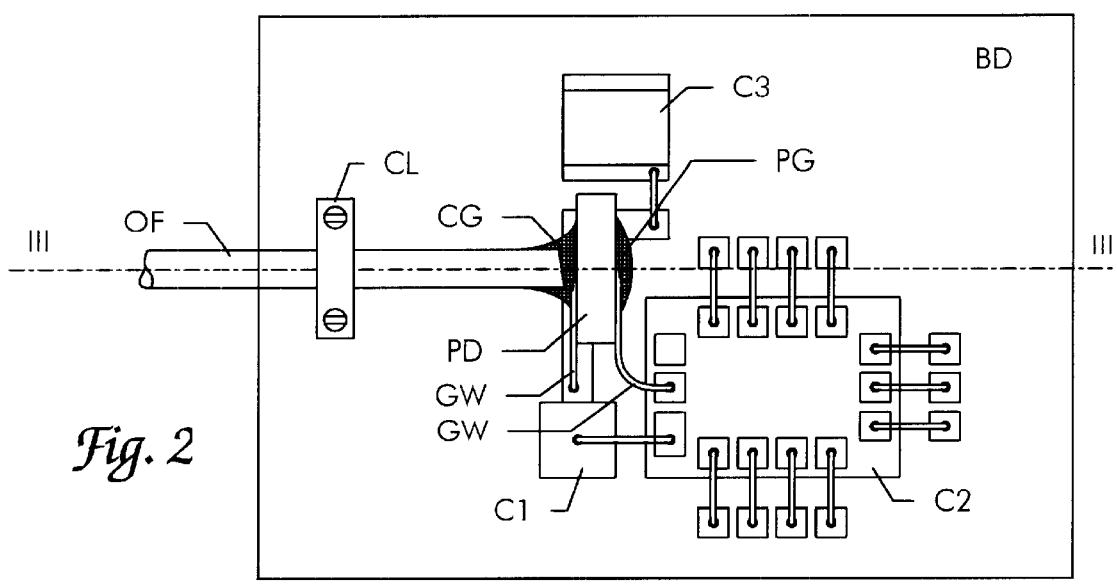
FIG. 2 is a top view of an arrangement with a photodiode and a fiber on a circuit board.

FIG. 2 shows the finished circuit board BD with the fiber OF fastened thereon in a top view. A clamp CL holds fiber OF on circuit board BD. Photodiode PD is attached to the end face of fiber OF by a droplet of optically transparent adhesive CG. Gold wires GW are soldered to both sides of photodiode PD and connected to circuit board BD. The adhesive droplets CG and PG also serve to fix the gold wires GW and protect them from being ripped off. Further electronic semiconductor components C1, C2, C3 are mounted on circuit board BD. They form the control circuit for photodiode PD and detect electric pulses which are generated by photodiode PD on the occurrence of light in fiber OF, and which are sent over the gold wires GW to the control circuit. Such control circuits are familiar to those skilled in the art, so that they need not be dealt with here.

Photodiode PD is mechanically attached only to the end face of optical fiber OF, namely by adhesive joint CG, and is not mechanically attached to the circuit board. As a result, the coupling between fiber OF and photodiode PD is free of mechanical stress, and temperature-induced length changes will not result in a misalignment between photodiode PD and fiber OF. The photodiode is electrically connected to the circuit board via the gold wires GW.

Figure 3:
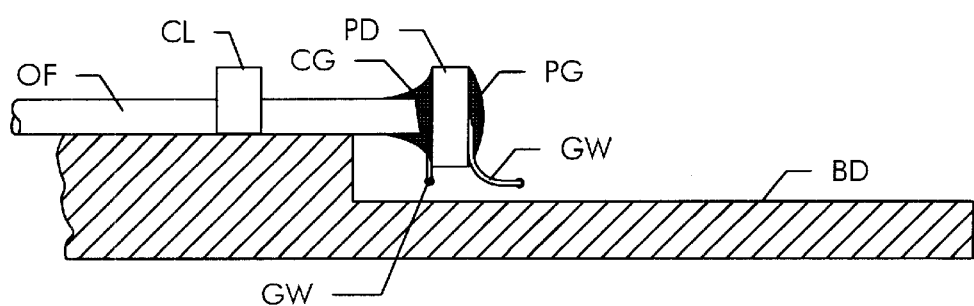
FIG. 3 is a section taken along line III—III of FIG. 2.

FIG. 3 shows a section through the circuit board taken along line III—III. Optical fiber OF is fastened on a step of circuit board BD with clamp CL. Photodiode PD has been attached to the end of the fiber with adhesive. The adhesive joint is designated CG. On the side of the photodiode remote from the fiber, another adhesive droplet PG has been applied to stabilize the contact wire GW and protect it from being ripped off.

It can be clearly seen that the photodiode is not mechanically attached to circuit board BD itself, but projects freely over the circuit board. The only mechanical attachment of photodiode PD is adhesive joint CG.

The adhesive used in the embodiment is a cationic epoxy resin that sets by the action of ultraviolet light. Such an adhesive is commercially available under the designation VITRALIT™1505. It has a refractive index of 1.517 and is sufficiently transparent in the wavelength range of 1300 nm to 1500 nm. Moreover, the adhesive is temperature-resistant in the range of −40° C. to +80° C., which generally includes the permissible temperature range for the operation of telecommunications equipment. Furthermore, the adhesive provides electric isolation, so that the soldered joints of the photodiode, which are covered with the adhesive, are protected against inadvertent short circuits. As a result, aligning the fiber with the photodiode bonded thereto relative to the circuit board is uncritical. Last but not least it is important that the adhesive does not lase in the wavelength range used, i.e., that it does not emit light as a result of the pumping action of laser light applied through the fiber.

Advantageously, the adhesive has a surface tension through which self-alignment of the adhesive-wetted chip to the fiber takes place.

For the adhesive bonding, the fiber and the chip are aligned with about 10 μm accuracy using a three-axis micrometric translation stage. The adhesive may be applied prior to the aligning procedure, since it only sets by the action of ultraviolet light. If an adhesive with a surface tension sufficient for self-alignment is used, the alignment between chip and fiber may be performed less accurately.

Before the photodiode is bonded to the fiber end, the latter should be cleaned with alcohol or another suitable solvent. Advantageously, the fiber end may be etched or ground to ensure better adhesion of the adhesive. For the chip, no specific pretreatment is necessary, but it is advantageous to clean the chip, for example in an ultrasonic bath using a suitable solvent.

In the embodiment, the fiber is fastened on the circuit board with a clamp and it is important to note that the clamp CL is only shown schematically and has for the sake of simplicity not the right scale and dimensions compared to the other components shown in FIGS. 2 and 3. Any other type of fastening is also possible, such as gluing the fiber in a corresponding groove in the circuit board.

In this embodiment, the photodiode is a chip contacted on both sides which is commercially available under the designation A1911DC. It is also possible to use photodiodes of other types, such as photodiodes mounted on a small carrier which have only one contact wire and where a second connection is made via the carrier. In that case, the photodiode will be bonded to the fiber end together with the carrier.

Figure 4:
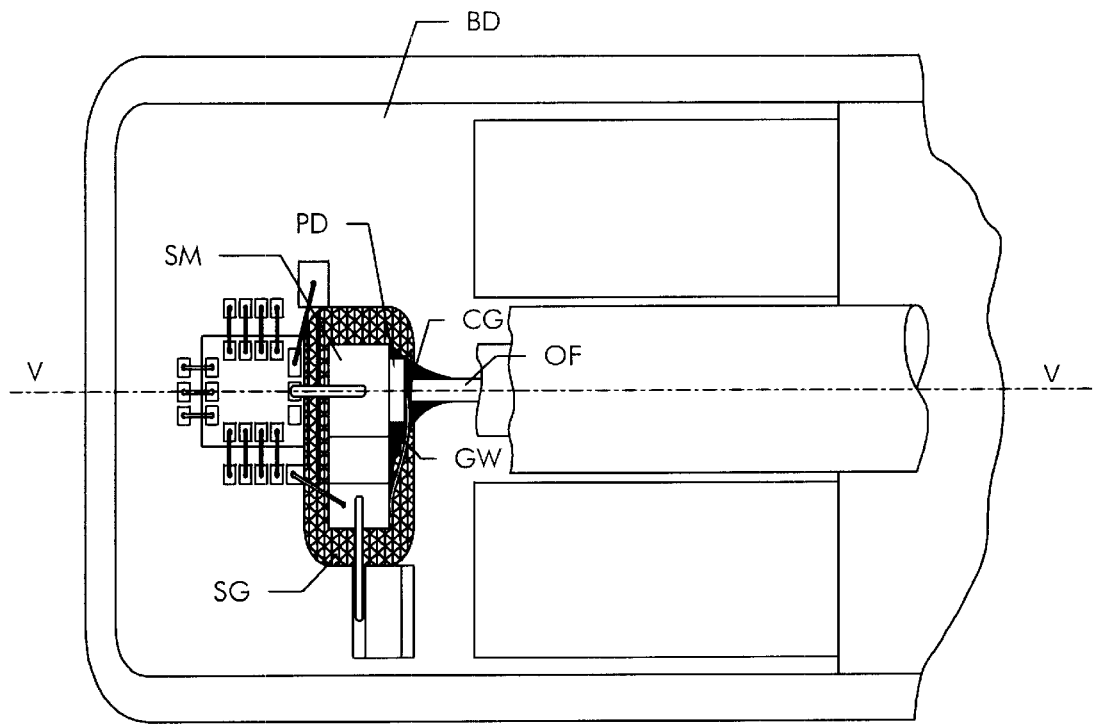
FIG. 4 is a top view of an arrangement with a photodiode and a fiber on a circuit board in a second embodiment.
Figure 5:
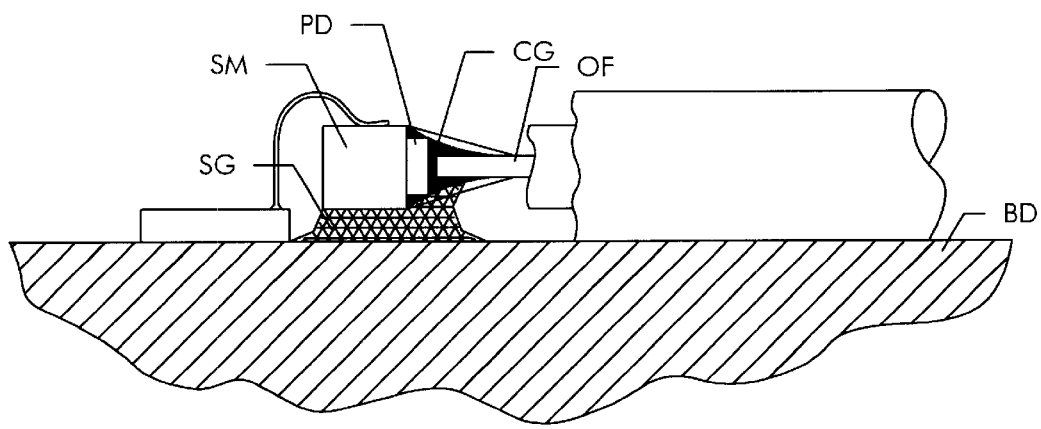
FIG. 5 is a section taken along line V—V of FIG. 4.

A second embodiment shown in FIGS. 4 and 5 illustrates such a photodiode mounted on a small carrier—a so-called submount. FIG. 4 shows a top view on the second embodiment. Same components are depicted with same reference signs as in FIGS. 2 and 3. Photodiode PD is soldered to submount SM and bonded with gold wire GW to submount SM. The submount soldered photodiode is glued at the end of optical fiber OF with UV polymerization cationic epoxy resin CG. The optical fiber is attached to the circuit board BD. A pad SG made of a silicone gel commercially available under the designation Hipec is optionally added between the submount soldered photodiode PD at the end of the fiber OF and the circuit board BD. This pad SG protects the arrangement against vibrations in order to prevent damage like fiber breakage or a break of the adhesive joint CG. It does not serve to attach the photodiode to the board but gives additional mechanical support after the fiber with the photodiode attached thereon is fastened on the board. Optical fiber OF in this embodiment comprises also a inner and outer coating which both are removed in the area of adhesive joint CG.

FIG. 5 shows a section taken along line V—V in FIG. 4. Photodiode PD soldered to submount SM is glued at the end of fiber OF and supported by pad SG on the board BD. Optical fiber OF lies on the board BD in a recess between two lateral posts where it may be secured by any kind of adhesive, for example. The submount SM is contacted with wires to the electrical components on circuit board BD.

In both embodiments, the fiber can be a conventional single-mode or multimode glass or plastic fiber or any other kind of fiber known to those skilled in the art.

What is claimed is:

1. An arrangement comprising a photodiode and an optical fiber wherein the photodiode is mounted on a submount and contacted by at least one contact wire and has its photosensitive surface attached directly to one end of the optical fiber by an optically transparent adhesive, wherein the fiber is fastened on a circuit board, and wherein the at least one contact wire of the photodiode is connected to the circuit board, with the adhesive joint between the fiber and the photodiode representing the only mechanical attachment to the photodiode and the submount, and wherein the photodiode and the submount are not mechanically fixed to the circuit board.

2. An arrangement as claimed in claim 1 wherein a pad is arranged between the circuit board and the submount.

3. An arrangement as claimed in claim 2 wherein the pad is made of silicone.

4. A circuit board having an optical fiber fastened thereon, to the end of which the photosensitive surface of a photodiode mounted on a submount and contacted by at least one contact wire is directly attached by an optically transparent adhesive, the circuit board being fitted with semiconductor components which form a control circuit for the photodiode, the at least one contact wire of the photodiode being connected to the circuit board, and the adhesive joint between the fiber and the photodiode representing the only mechanical attachment to the photodiode and the submount which are not mechanically fixed to the circuit board.

5. An arrangement as claimed in claim 4 wherein a pad is arranged between the circuit board and the submount.

6. An arrangement as claimed in claim 5 wherein the pad is made of silicone.

7. A method of coupling an optical fiber to a photodiode, comprising the steps of mounting the photodiode on a submount, contacting the photodiode by means of at least one contact wire, and attaching the photosensitive surface of the photodiode to one end of the optical fiber using an optically transparent adhesive, wherein the fiber and the photodiode are aligned on a three-axis micrometric translation stage and are held in place until the adhesive has set.

* * * * *